Patented May 17, 1949

2,470,202

UNITED STATES PATENT OFFICE 2,470,202

FILTERING PROCESS

Leonard Wickenden, Westport, Conn.

No Drawing. Application April 19, 1947,
Serial No. 742,725

6 Claims. (Cl. 127—55)

This invention relates to filtering and decolorizing and has for its object the provision of an improved method of filtering and decolorizing. My invention employs a filter material comprising diatomaceous earth held on the surfaces of coke particles which is especially effective in the removal of such coloring matter and organic impurities as are present in water and aqueous solutions such as impure sugar syrups and melts (hereinafter called "sugar syrups").

In operations customarily carried out in the purification of sugar syrups by filtration through filters containing bone char, diatomaceous earth and activated carbon to remove suspended and coloring matter, it is necessary to reduce the concentration of many low-grade sugar syrups, such as affinations, to around 35% to 40% solids in order to accomplish suitably efficient purification.

My invention enables me to filter low-grade sugar syrups containing around 50% of solids (50 Brix) with better removal of coloring and other matter than has been possible heretofore with similar filtering and adsorbing materials. Not only can I effect a marked reduction in the water which must be evaporated because I can filter a more concentrated solution of syrup, but my filter is considerably less costly. I achieve an improved filtering on relatively concentrated syrups with much less diatomaceous earth than is usually required in present practices. I can use not only the lower priced diatomaceous earth but such earth in relatively small quantities.

One of the important features of the method of my invention is that it may be practiced in the apparatus of existing plants having filtering equipment for the filtering of sugar syrups through bone char.

In accordance with the method of my invention, the sugar syrup, at a density of 50 Brix, or even higher, is subjected to the purifying action of diatomaceous earth which is in such admixture with fine granular petroleum coke that the particles of diatomaceous earth are effectively held on the surfaces of the coke particles. Owing to the readiness with which the liquor passes through a filter of this type, uncalcined diatomaceous earth can be used, whereas, when such a syrup is filtered through a press, the rate of filtration obtained with uncalcined earth is so slow that calcined earth must be used. Not only is the uncalcined earth lower in price, but it possesses higher adsorptive properties than the calcined earth. Sugar liquors treated with it are, therefore, purer and lighter in color than those treated with calcined earth. It is found that sugar syrups pass readily through the filter without dislodging or washing away the particles of diatomaceous earth.

After filtration of the sugar liquor is complete, the filter can be sweetened off by running water through it in order to recover sugar values. The carrier with the exhausted earth attached can then be dumped into a washing tank and subjected to steady agitation in the presence of a current of water, which enters at the bottom of the tank and overflows at the top. Owing to the fact that the carbonaceous carrier readily settles in water, while diatomaceous earth tends to remain in suspension, it is a simple matter to remove from the carrier the exhausted earth which flows out of the upper exit of the tank in the form of a water suspension. The clean carrier can then be blown with air until its moisture content is reduced to the required point and can then be mixed with a further quantity of unused diatomaceous earth and the mixture once again introduced into the filter. This process can be repeated indefinitely, so that, except for minor mechanical losses, the same carbonaceous material can be used over and over again.

In producing a filter for use in my invention, I prefer to grind a low volatile petroleum coke and to separate by screening a fraction which I have found to be most efficient, both in the retainment of the diatomaceous earth and in the passage of the concentrated sugar syrups. I prefer to remove that fraction which will pass through a 10-mesh screen and be retained on a 60-mesh screen (Tyler series). This screened portion of petroleum coke is used as the supporting or carrying medium for the diatomaceous earth. One satisfactory way of applying diatomaceous earth to the particles of petroleum coke is to take the coke in a crumbly moist condition, containing from 10 to 25% of water. The diatomaceous earth, in dry form, is then added to the coke and thoroughly mixed in a tumbling drum or some similar mixer until the earth is distributed as evenly as possible throughout the mass of the coke. The resulting product is then ready for filtering. When the filter material is to be used for other purposes, for example in the purification of water, the diatomaceous earth may be applied in a water sludge.

The following is an example of a filter as used in the filtering of a 51.3 Brix affination syrup:

400 grams of dry petroleum coke having the following screen analysis:

Through 10 mesh but retained on 20 mesh—
  33⅓%
Through 20 mesh but retained on 40 mesh—
  33⅓%
Through 40 mesh but retained on 60 mesh—
  33⅓% were mixed with six grams of diatomaceous earth which is about 1½% of the weight of the petroleum coke. This filter was used to filter the affination syrup at a temperature of 190° F. flowing through at the rate of 600 cc. per hour until 2300 cc. were filtered. The solid content in the filtrate weighed 1462 grams. This is equivalent to the use of 0.41% of diatomaceous earth based on the weight of the solids in the filtrate. The filtrates showed a color removal of 20 percent compared with the original.

It will be understood that the method of this invention is applicable not only to the treatment of cane and beet syrups but to any syrup which can be refined by diatomaceous earth in combination with bone char or activated carbon.

I claim:

1. In the purification of a sugar syrup prior to a decolorizing treatment, the improvement which comprises filtering by gravity flow through a filter bed comprising granular particles of coke having on the exterior surfaces thereof a coating of uncalcined diatomaceous earth to remove both suspended and coloring matter.

2. In the purification of a sugar syrup prior to decolorizing with activated carbonaceous matter, the improvement which comprises flowing a syrup at a density of at least 50 Brix through a filter formed of granular particles of coke coated with uncalcined diatomaceous earth to remove both suspended and coloring matter.

3. In the purification of low-grade sugar syrups including affinations at densities of at least 50 Brix, the improvement which comprises flowing the syrup through a filter formed of granular particles of coke the surfaces of which are coated with uncalcined diatomaceous earth to remove both coloring and suspended matter.

4. In the method of claim 1, using coke particles which will pass through a 10 mesh screen but be retained on a 60 mesh screen.

5. In the method of claim 2, using coke particles which will pass through a 10 mesh screen but be retained on a 60 mesh screen.

6. In the method of claim 3, using coke particles which will pass through a 10 mesh screen but be retained on a 60 mesh screen.

LEONARD WICKENDEN.

REFERENCES CITED

The following references are of record in the file of this patent:

UNITED STATES PATENTS

| Number | Name | Date |
| --- | --- | --- |
| 1,474,559 | Smith | Nov. 20, 1923 |
| 1,516,337 | Cumming | Nov. 18, 1924 |
| 1,528,370 | Gambel | Mar. 3, 1925 |
| 1,586,486 | Thatcher | May 25, 1926 |
| 2,209,069 | Bodenheim | July 23, 1940 |
| 2,372,996 | Wickenden | Apr. 3, 1945 |